Aug. 20, 1935.  F. W. AMEND  2,011,699
KETTLE SCRAPER
Filed Nov. 28, 1932
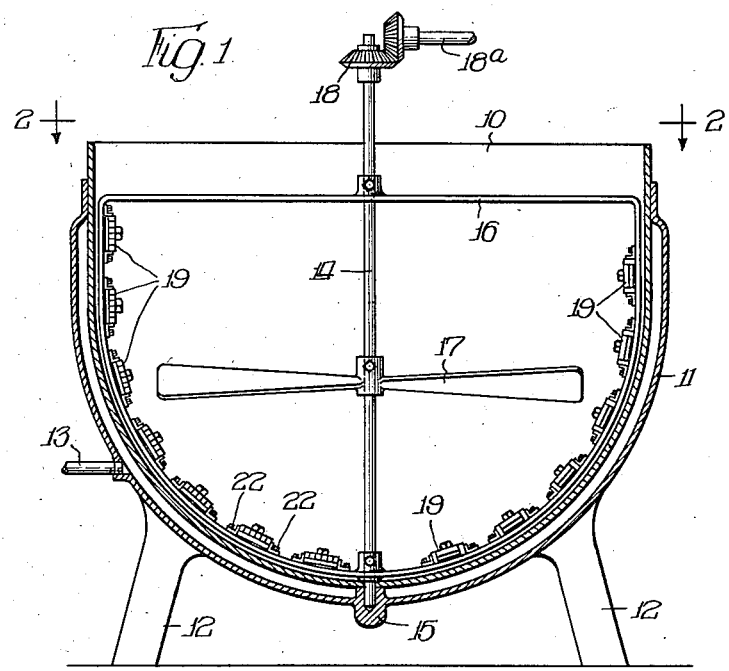
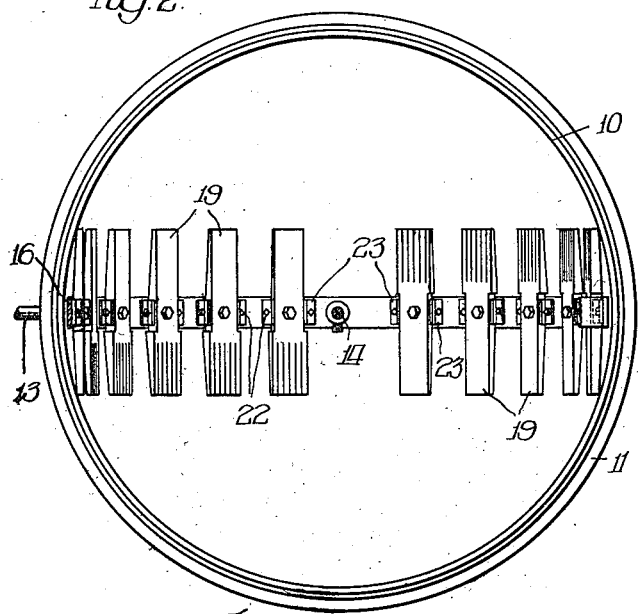
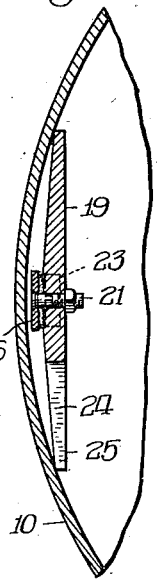
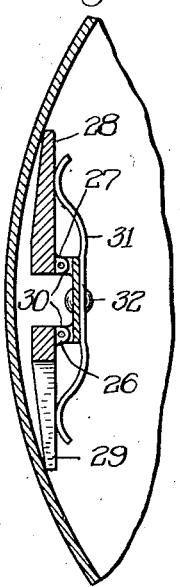
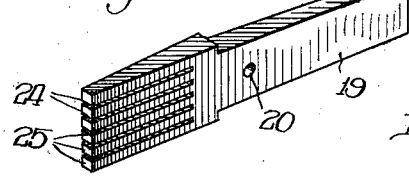
Inventor:
Fred W. Amend, Patented Aug. 20, 1935

2,011,699

UNITED STATES PATENT OFFICE 2,011,699

KETTLE SCRAPER

Fred W. Amend, Danville, Ill.

Application November 28, 1932, Serial No. 644,677

7 Claims. (Cl. 259—107)

My invention relates to a scraper mechanism particularly for use in connection with cooking receptacles used in the manufacture of candy or similar products, where it is necessary to keep the material being cooked from adhering to the sides of the vessel while the cooking operation is taking place.

A further object of my invention is the provision of a scraper mechanism for use particularly in vessels or kettles composed of copper and in which the kettles are fashioned by being hammered into proper shape, thereby leaving the prints of the hammer marks on the surface of the kettle making the surface slightly irregular so that the scraper must conform to the irregularities of the metal in order to remove the material from the sides of the kettle.

Another and further object is the provision of a scraper which is preferably made from wood and fashioned in such manner that the ends of the scraper will conform to the irregularities of the kettle and which, being comparatively soft, will not injure or scratch the surface of the kettle, such as might happen if metal were used, particularly with a copper kettle which is a soft material.

Another and further object of the invention is the provision of a scraper which is under tension when placed in the kettle in such manner that it exerts a constant pressure on the sides of the kettle so as to remove all material therefrom during the cooking operation, and which polishes and retains the inner surface of the kettle in a bright, clean condition at all times without injuring or scratching the surface thereof.

Another and further object of my invention is the provision of scrapers for candy kettles which are mounted in such a manner that varying amounts of tension can be applied thereto to insure proper contact with the side of the kettle and which is also used as a wear take-up during the life of the scrapers.

Another and further object of my invention is the provision of scraper mechanism in which the tension or pressure on the scrapers can be adjusted so as to be kept uniform and which retains the operating shaft in proper alignment and the whole scraper operating mechanism thereby kept in balanced relation.

I am aware that it is common practice, particularly in the candy making art, to use kettles with scrapers, but these scrapers have proven unsatisfactory in service and cannot be held in frictional engagement with the sides of the kettle with sufficient pressure to insure the removal of all the material which is being cooked from the sides of the kettle, and which at the same time will conform to the irregularities in the surface of the kettle. In practice I have found that the use of the scraper of my invention reduces the time of cooking the candy approximately one-third and thereby shortens the time of the cooking operation very materially, increasing the capacity of the kettles and also lessening the chances of the batch being cooked becoming dark, which happens when the materials used in making up the candy are cooked for a longer period of time. In other words, the longer the material is cooked the darker it becomes during the cooking operation. The use of my improved scraper lessens the time necessary for the cooking operation, thus not only increasing the capacity of the kettles but increasing the quality of the candy cooked in the kettles as well.

These and other objects of my invention will be more fully and better understood by reference to the accompanying sheet of drawings, in which—

Figure 1 is a vertical sectional view of a candy kettle embodying my invention;

Figure 2 is a top plan view of the kettle having my invention embodied therein;

Figure 3 is a detailed sectional view showing one of the scrapers in position on the side of the kettle;

Figure 4 is a perspective view of one of the individual scraping members; and

Figure 5 is a modified form of scraper which may be employed instead of the form illustrated in the other figures.

Referring now specifically to the drawing, a kettle 10 is illustrated, commonly made of copper, with a jacket 11 extending therearound with a plurality of supporting legs 12, 12 being provided. A steam pipe 13 extends through the jacket 11 so as to discharge steam into the space between the kettle 10 and the jacket 11, it being common to cook the material in these kettles by means of live steam discharged against the surface of the kettle 10. Extending vertically in the kettle 10 is a shaft 14 which extends into a bearing 15 at the bottom of the jacket 11 and has mounted thereon a D-shaped member 16, the circular portion of which conforms substantially to the curvature of the kettle 10 and is spaced a short distance therefrom as shown particularly in Figures 1 and 3. Mounted upon the shaft 14 is a stirring paddle 17 with a gear 18 mounted upon the upper end of the shaft 14 for engagement with a suitable cooperating gear on a shaft 18ª leading to any source of power adapted to drive the mechanism when in operation. The shaft 18ª may be appropriately journaled in order to hold the D-shaped member in the kettle, although usually the D-shaped member with the shafts is sufficiently heavy so the scrapers are held in proper contact with the surface of the kettle.

Secured around the inner periphery of the D-shaped member is a plurality of paddles or scrapers 19, 19, one of these scrapers being shown in detail in Figure 4. Each scraper has a hole 20 located centrally thereof and extending therethrough, through which bolts 21, 21 pass for securing the scraper to the D-shaped member 16. Secured to the D-shaped member by means of bolts or rivets 22, and extending transversely thereacross, is a plurality of angles 23, 23, each pair of which are spaced a sufficient distance apart so the paddles are placed therebetween, these angles being adapted to prevent the scrapers from turning or skewing around. The scrapers 19 are preferably slightly wider at one end than the other and preferably have a plurality of slots 24, 24 therein forming fingers 25, 25 at the forward end of the scraper. These fingers 25 are comparatively narrow so as to conform more closely to the irregular contour of the inside of the kettle 10, caused by the hammer marks when the kettle is originally manufactured. The paddles 19 are sufficiently long so that both their ends are in contact with the surface of the kettle 10, and are preferably made from hickory wood or some other appropriate wood having considerable elasticity and when placed on the D-shaped member are slightly bent or placed under tension so that the ends bear tightly against the inner surface of the kettle 10, thereby insuring close contact of the scraper with the inner surface of the kettle, and are spaced apart at their centers so that as they wear, by tightening the nuts the paddles are kept in contact with the kettle and the whole scraper mechanism may be kept in balanced relation by the proper adjustment of these paddles.

The device is adapted to rotate in a counter-clockwise direction so that the slotted ends or fingers of the paddles are placed on the forward sides of the paddle and when the device is rotated the fingers contact with the inner surface of the kettle to remove the material therefrom and prevent it from sticking to the sides of the kettle. It will be noticed that these paddles on one side of the D are placed in a slightly different plane from the scrapers on the other side, so that as the device makes one complete revolution the entire inner surface of the kettle has been subjected to the operation of the scrapers.

In Figure 5 is illustrated a slightly modified form of device in which a D-shaped member is shown having a pair of ribs 26 and 27, with a pair of scraping members 28 and 29 respectively mounted thereon by means of brackets 30, 30 secured to the scrapers at the rear end thereof. A spring member 31 is secured to the D-shaped member by means of a rivet 32 so that pressure is applied to the backs of the members 28 and 29. The scrapers 28 and 29 are slotted at their ends in the same manner as shown in Figure 4 so as to provide a plurality of fingers on the forward end of the scraper to enable the scraping member to conform to the irregular surface of the kettle.

In this manner it will be understood that paddles being made from wood are much softer than metal and are placed under tension in the kettle so as to exert sufficient pressure against the sides thereof to remove the material from the sides of the kettle and prevent it from sticking and solidifying or being burned against the inner side of the kettle. This material is moved out to the center of the kettle where it is thoroughly mixed with the material cooking. In this manner all danger of the material adhering to the sides of the kettle is prevented and injury to the kettle is prevented. I have been able to cook candy sufficiently in approximately thirty minutes time, whereas in the use of kettles before this invention was applied, it has taken approximately fifty minutes to sufficiently cook a batch of material to make candy from it.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

1. A cooking mechanism, comprising in combination, a kettle, a shaft therein, a frame rotatably mounted thereon, and a plurality of unitary resilient scraping devices mounted on said frame having each of their ends positively held against the sides of the kettle with the middle portion of the scrapers out of contact with the kettle.

2. A cooking mechanism, comprising in combination, a kettle, a shaft therein, a frame rotatably mounted thereon, and a plurality of unitary resilient scraping devices mounted on said frame having each of their ends positively held against the sides of the kettle, the forward end of the scraper having a plurality of longitudinally extending slots therein, the said scrapers spanning the wall of the kettle intermediate the ends of the scraper.

3. A cooking mechanism, comprising in combination, a kettle, a shaft therein, a frame mounted thereon, and a plurality of unitary resilient scraping devices mounted on said frame having each of their ends positively held against the sides of the kettle and spanning the space therebetween, the forward ends of the scrapers having a plurality of flexible fingers formed therein.

4. A cooking mechanism comprising, in combination, a kettle, a rotatably mounted member therein spaced apart from the wall of the kettle, paddles on the inner side of said member having each of their ends in contact with the sides of the kettle, and a connection between said mechanism and said paddles, the paddles being mounted in spaced relation with said rotatably mounted member.

5. A cooking mechanism, comprising in combination, a kettle a rotatable shaft therein, a frame on said shaft and adapted to rotate therewith, unitary resilient wooden paddles secured to said frame having each of their ends in contact with the kettle and spanning the space therebetween, and means whereby the said scrapers are secured to said frame and placed under tension.

6. A cooking mechanism comprising, in combination, a kettle, a rotatable shaft therein, a frame on said shaft adapted to rotate therewith, guides on said frame, a scraper on said frame between each pair of guides, and a bolt securing each of said scrapers to the frame, the scrapers being normally spaced apart from said frame and spanning the wall of the kettle between the ends thereof.

7. A cooking mechanism comprising, in combination, a kettle, a rotatable shaft therein, a frame on said shaft adapted to rotate therewith, guides on said frame, a scraper on said frame between each pair of guides, and a bolt securing each of said scrapers to the frame, the scrapers being normally spaced apart from said frame.

FRED W. AMEND.